US011138150B2

(12) United States Patent
Schmidt et al.

(10) Patent No.: US 11,138,150 B2
(45) Date of Patent: Oct. 5, 2021

(54) NETWORK REPOSITORY FOR METADATA

(71) Applicant: Lattice Semiconductor Corporation, Portland, OR (US)

(72) Inventors: Brian K. Schmidt, Sunnyvale, CA (US); James G. Hanko, Redwood City, CA (US); J. Duane Northcutt, Menlo Park, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 66 days.

(21) Appl. No.: 15/799,977

(22) Filed: Oct. 31, 2017

(65) Prior Publication Data

US 2018/0052859 A1    Feb. 22, 2018

Related U.S. Application Data

(63) Continuation of application No. 13/919,773, filed on Jun. 17, 2013, now Pat. No. 9,934,227, which is a (Continued)

(51) Int. Cl.
*G06F 15/16* (2006.01)
*G06F 16/13* (2019.01)
*G06F 16/48* (2019.01)

(52) U.S. Cl.
CPC .............. *G06F 16/13* (2019.01); *G06F 16/48* (2019.01)

(58) Field of Classification Search
CPC ................................. G06F 16/13; G06F 16/48
See application file for complete search history.

(56) References Cited

U.S. PATENT DOCUMENTS 5,339,392 A * 8/1994 Risberg ................ G06F 3/0481
                                                            715/762
5,870,746 A    2/1999 Knutson et al.
(Continued)

FOREIGN PATENT DOCUMENTS

JP   H09-305473 A    11/1997
JP   2005-524138 A    8/2005
(Continued)

OTHER PUBLICATIONS

European Summons to Attend Oral Proceedings Pursuant to Rule 115(1) EPC, European Application No. 08772438.1, Jun. 8, 2015, 7 pages.
(Continued)

*Primary Examiner* — Hua Fan
(74) *Attorney, Agent, or Firm* — Hayes and Boone, LLP

(57) ABSTRACT

A method and apparatus for a network repository for metadata. Embodiments of a data repository include a memory to store data including one or more data content items, where each data content item is associated with zero or more metadata items, and where each data content item is associated with a handle and each metadata item is associated with an attribute name. The data repository further includes a network interface configured to communicate with a client device, and a control unit configured to control the storage of data in the memory, where the control unit provides functions for writing data to and reading data from the memory and where the control unit is to transfer the data without interpretation.

18 Claims, 9 Drawing Sheets

Related U.S. Application Data continuation of application No. 11/836,082, filed on Aug. 8, 2007, now Pat. No. 8,468,212.

(56) References Cited

U.S. PATENT DOCUMENTS

| | | | |
|---|---|---|---|
| 6,226,666 B1* | 5/2001 | Chang | G06Q 10/107 379/100.08 |
| 6,516,336 B1 | 2/2003 | Davis et al. | |
| 6,732,124 B1 | 5/2004 | Koseki et al. | |
| 7,031,962 B2 | 4/2006 | Moses | |
| 7,178,100 B2 | 2/2007 | Call | |
| 2002/0143521 A1 | 10/2002 | Call | |
| 2002/0143976 A1 | 10/2002 | Barker et al. | |
| 2002/0147725 A1 | 10/2002 | Janssen et al. | |
| 2003/0120868 A1 | 6/2003 | Royer, Jr. et al. | |
| 2004/0122645 A1* | 6/2004 | Shevenell | H04L 41/145 703/21 |
| 2005/0010963 A1* | 1/2005 | Zeng | H04L 29/06 725/131 |
| 2005/0065986 A1 | 3/2005 | Bixby et al. | |
| 2006/0149704 A1 | 7/2006 | Wyatt et al. | |
| 2007/0083497 A1 | 4/2007 | Martinez | |
| 2007/0150479 A1 | 6/2007 | Issa et al. | |

FOREIGN PATENT DOCUMENTS

| | | |
|---|---|---|
| WO | WO 2005/072157 | 8/2005 |
| WO | WO 2006/018717 | 2/2006 |
| WO | WO 2006/093910 | 9/2006 |
| WO | WO 2007/044241 | 4/2007 |
| WO | WO 2007/047560 | 4/2007 |
| WO | WO 2007/076135 | 7/2007 |
| WO | WO 2007/076459 | 7/2007 |

OTHER PUBLICATIONS

Sun, S. et al., "Handle System Namespace and Service Definition," Nov. 1, 2003, Network Working Group, 41 pages.
Korean Office Action, Korean Application No. 10-2010-7005044, dated Apr. 29, 2014, 7 pages.
International Preliminary Report on Patentability dated Feb. 18, 2010 for International Application No. PCT/US2008/069363.
Non-Final Office Action for U.S. Appl. No. 11/836,082 dated Jun. 24, 2010.
Final Office Action for U.S. Appl. No. 11/836,082 dated Dec. 9, 2010.
Office Action from Chinese Patent App. No. 200880102008.1 dated Nov. 16, 2011, 10 pages.
Office Action from TW Patent Application No. 097126140 dated Mar. 3, 2012, 15 pgs.
8029P025PCT Partial Search Report dated Feb. 16, 2009 for PCT Application No. PCT/US2008/069363, Feb. 16, 2009.
Decision on Rejection dated Oct. 30, 2012 (+English translation), in Chinese Patent Application No. 200880102008.1, 10 pages.
Examination report dated Jul. 9, 2012, in European Patent Application No. 08772438.1, 6 pages.
Office Action dated Jan. 10, 2013 (+English translation), in Japanese Patent Application No. 2010-520042, 4 pages.
Office Action dated Jul. 3, 2013 (+English translation), in Japanese Patent Application No. 2010-520042, 6 pages.
8029P025PCT Partial Search Report dated Nov. 4, 2008 for PCT Application No. PCT/US2008/069363, Nov. 4, 2008.
Japanese First Office Action, Japanese Application No. 2013-243786, dated Sep. 9, 2014, 6 pages (with English Summary).
Japanese Second Office Action, Japanese Application No. 2013-243786, dated Jan. 27, 2015, 3 pages (with English Summary).
Sony Bravia, KDL-40X1000/KDL-46X1000, 2005, 8 pages, May Be Retrieved at URL: http://www.sony.jp/ServiceArea/impdf/pdf/2639847032.pdf (with Concise Explanation of Relevance).

* cited by examiner

NETWORK REPOSITORY FOR METADATA

CROSS-REFERENCE TO RELATED APPLICATIONS

This application is a continuation of U.S. patent application Ser. No. 13/919,773 filed on Jun. 17, 2013, which is a continuation of U.S. patent application Ser. No. 11/836,082 filed on Aug. 8, 2007, all of which are incorporated herein by reference in their entirety.

TECHNICAL FIELD

Embodiments of the invention generally relate to the field of networks and, more particularly, to a method and apparatus for a network repository for metadata.

BACKGROUND

A network may include the interconnection of multiple personal electronic entertainment media devices. The various media devices may be networked together in order to share data, increase convenience, and make fuller use of each element. For example, certain devices within a home may be connected together. In such an environment, there are multiple potential sources and users of streaming digital media content for audio, video, gaming, and other uses.

Within such a network, there may be data of various different data types and formats, together with connected metadata, where metadata refers to information about other data. For example, metadata associated with digital music may include information regarding the artist, song title, album art, release date, and other information. Repositories of digital data typically support the ability to browse, filter, or search the repository for data with particular attributes. This is typically accomplished by storing the associated metadata in a database that supports these operations. In contemporary systems, the database and the data repository are typically conjoined as a single system. For example, a digital music system maintains a database of songs, while a DVR (digital video recorder) may maintain its own database of recorded television shows.

However, in an interconnected network, there may be a need to share a data repository across a network. The sharing of the data repository introduces complications for maintaining the related metadata. For example, each client of a repository may have different demands on the format and data types to be stored in the database. Further, a part of the value added by each client may be the types of queries supported and the performance provided in responding to such queries. It is impractical to support a single database format that can meet all needs in a network, particularly if the set of possible metadata that will be stored in the database cannot be pre-determined. For example, a digital media repository may include personal photographs and home movies, premium movie content, television recordings, digital music, and other data. The set of metadata may be content-specific, personalized (such as user ratings), vendor-specific, and specific to other factors. On the other hand, a completely open-ended database, while allowing a wide variety of data types, would be contrary to demands for performance and customization.

SUMMARY OF THE INVENTION

A method and apparatus are provided for a network repository for metadata.

In a first aspect of the invention, a data repository may include a memory to store data including one or more data content items, where each data content item is associated with zero or more metadata items, and where each data content item is associated with a handle and each metadata item is associated with an attribute name. The data repository further includes a network interface configured to communicate with a client device, and a control unit configured to control the storage of data in the memory, where the control unit provides functions for writing data to and reading data from the memory and where the control unit is to transfer the data without interpretation.

In a second aspect of the invention, a network device may include a network interface to communicate with a network data repository, where the data repository holds a set of content data and metadata as opaque data, with each data content item being associated with a handle and each metadata item being associated with an attribute name The network device further includes a network unit to control access to the network data repository, the network unit to provide database functions for the set of content data and metadata utilizing the content handles and the metadata attribute names. The network device also may include a cache memory to store one or more metadata items from the network data repository.

In a third aspect of the invention, a network may include a first network device containing a database, with the database containing a plurality of data content items, each data content item having zero or more associated metadata items, where the first network device holds the data content items and metadata items as opaque data. The network may further include a second network device containing a cache memory to cache one or more metadata items from the first network device, wherein the second network device is to provide data access to the data contained in the database.

In a fourth aspect of the invention, a method may include storing data in a data repository, the data including multiple content data items, and each content data item being associated with zero or more metadata items. The method further includes associating each content data item with a handle and associating each metadata item with an attribute name, and providing access to the data by a client device without interpretation of the data utilizing the handles of the content data and the attribute names of the metadata.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
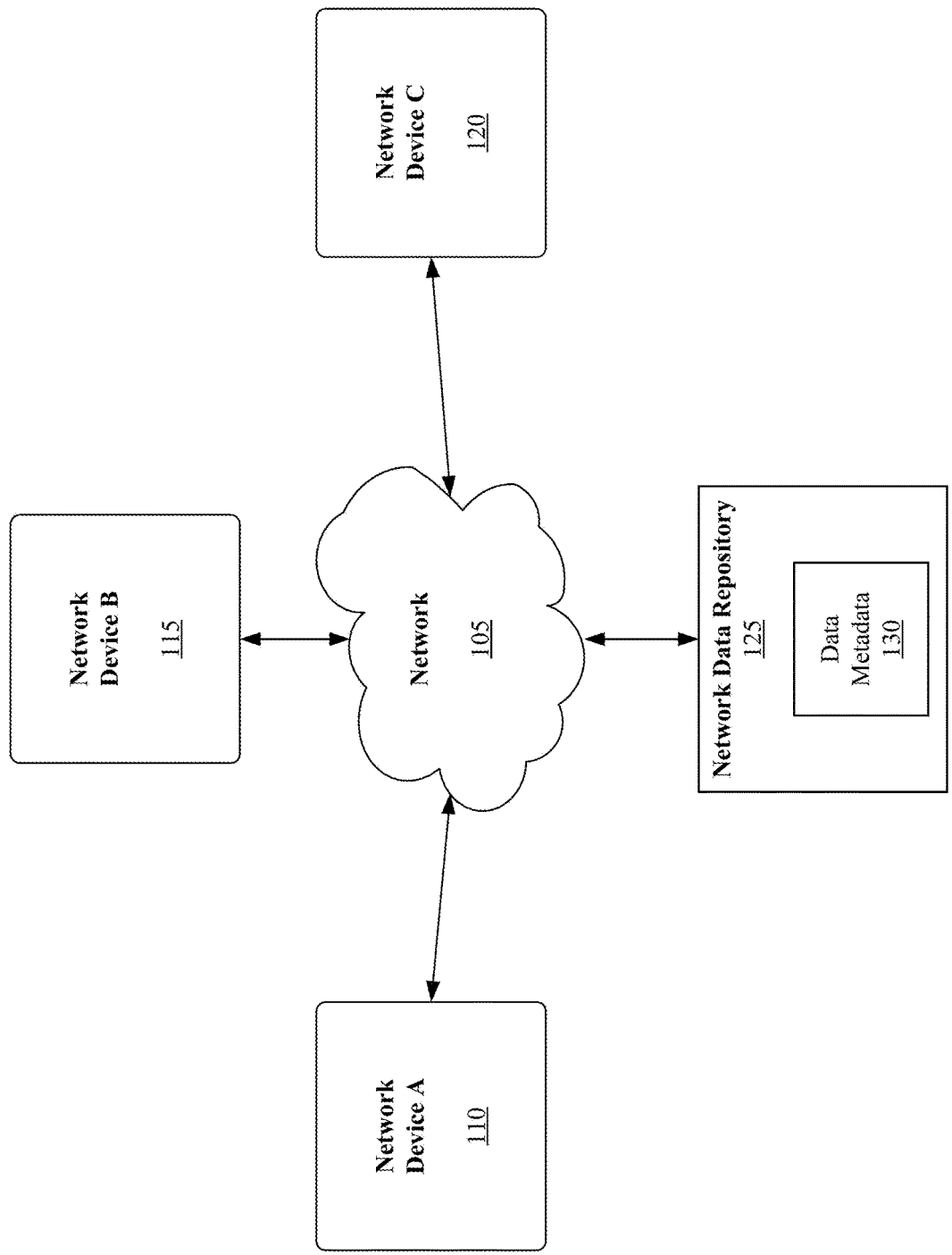
FIG. 1 is an illustration of embodiments of a network including a network data repository.

Embodiments of the invention are generally directed to a method and apparatus for a network repository for metadata.

As used herein, "entertainment network" means an interconnection network to deliver digital media content (including music, audio/video, gaming, photos, and others) between devices. An entertainment network may include a personal entertainment network, such as a network in a household, an entertainment network in a business setting, or any other network of entertainment devices. In such a network, certain network devices may be the source of media content, such as a digital television tuner, cable set-top box, video storage server, and other source devices. Other devices may display or use media content, such as a digital television, home theater system, audio system, gaming system, and other devices. Further, certain devices may be intended to store or transfer media content, such as video and audio storage servers. Certain devices may perform multiple media functions. In some embodiments, the network devices may be co-located on a single local area network. In other embodiments, the network devices may span multiple network segments, such as through tunneling between local area networks. The entertainment network may include multiple data encoding and encryption processes.

As used herein, "data" means content data, metadata for content data, and any other type of data.

As used here, "opaque data" is data that is passed or otherwise handled without interpretation of the data.

In some embodiments, a network includes a general repository for content data and metadata. In some embodiments, many different kinds of data and metadata exist in the repository using the single storage. In some embodiments, storage of media metadata is provided in a general repository without regard to the type of data that is stored. Such a data repository may store multiple different types and formats of data. In some embodiments, a data repository stores data in an opaque manner, with the data repository operating without interpreting the data and having no knowledge of the type or format of the data stored. In some embodiments, metadata is stored in a manner that allows for simple caching of the data in a network device. In some embodiments, a network allows for storage and caching of network data in a form that is accessible by network devices that have limited processing and buffering capabilities.

In one example, a network may be an entertainment network including multiple interconnected entertainment devices. In such a network, a storage server may act as a network repository for multiple different types and formats of media data. A network device in such a network, such as a set-top box in one example, may include a cache of metadata regarding stored movies or television programs, with the media data and the original metadata being stored on a storage server. In such environment, the cache needs to be maintained in an up-to-date state in relation to the metadata that is present on the storage server.

In an embodiment of the invention, a database containing data and associated metadata, such as media content and associated media content metadata, is supported in a low resource environment, with the database including search and filter options. Conventional databases in general are highly specific with regard to the types and formats of data that may be stored in the databases. However, data such as media content and associated metadata may greatly vary with regard to type and format. In some embodiments, a database is not constrained with regard to data types and formats allowed, and the data types and formats may be unknown for the purposes of the database. In conventional databases, the database back end (including the data repository and set of data accessors) will support data storage and a set of standard database operations. However, these database operations are generally complex and data specific. In a database that supports a wide variety of types and formats of data, such database functionality would be impractical to implement, particularly in a low resource environment in which data elements have limited memory or processing capability.

In some embodiments, a database repository provides network access to opaque data items. In some embodiments, operations with regard to data stored in a database reside in the respective clients for the data, rather than in the database, while the database is partitioned to provide for storage of the data. In some embodiments, the database system is limited to file copy semantics, allowing a client to read or write files as atomic units. In some embodiments, access is provided to the database without requiring any interpretation of the metadata by the database repository. In some embodiments, the database includes filtering capabilities, allowing for data searching with low resources and without knowledge of the actual format or content of stored data.

In some embodiments, a mechanism is provided to limit required file transfers between a database client/front end and the database repository/back end. In some embodiments, a process is provided to efficiently cache and access the opaque data items, while minimizing bandwidth and access requests.

In some embodiments, a repository holds a diverse set of data, which is referred to herein as "content". In some embodiments, each piece or item of content is assigned a locally unique, non-repeated identifier (or "handle") by the repository before or when the content is first stored. This handle is used by clients of the repository to refer to a particular piece of content and its associated metadata. In a typical implementation, a handle may be a designation with a fixed format, such as an integer with a fixed representation (e.g. 32-bit big endian or 64-bit big endian), but the handle is not limited to any particular representation. The handle may be thought of as a directory or folder in the repository, which serves as a container to hold the actual content and metadata. In one example, a directory (which may be named Content) may further contain one or more files that include the stored content, together with another directory (which may be named Metadata) that may contain associated metadata.

In some embodiments, metadata corresponds to attributes that describe the associated data. In this description of the structure of a data repository and associated metadata, file system terminology is used as an example because this type of system is commonly used and may be implemented in a wide variety of embodiments, such as a system on a personal computer, network attached storage, portable devices, single-chip solutions, and other system. However, embodiments are not limited to file system and may be implemented in other infrastructures. In some embodiments, the file size provides the size of the attribute. Each metadata element has a name (or key), a length (or file size), and an associated value (the file contents). In utilizing file system terminology, each file in the metadata directory may represent one piece of metadata, or attribute. Using the example of a file system, the name of the file corresponds to the name of the metadata attribute, and the contents of the file correspond to the associated value. In typical storage systems, names are represented as text strings. In some embodiments, in order to support low-resource implementations, all names are instead represented as integers with a fixed format, e.g. 32-bit big endian. The use of fixed format integers thus may lessen the burden of variable-length string processing and simplify buffer management for attribute names, such as when servicing a request to retrieve the value of a particular attribute.

To provide for caching of data in the data repository, in some embodiments a network data repository includes a memory or register to store a time stamp or other time value, the time value representing the last change in the data stored in the data repository. In some embodiments, the time value is a generation count (or GC) that increases monotonically each time there is a data change, such as when any data is newly stored, modified, or deleted, but other types of time values may also be used. In some embodiments, the generation count of the data repository is compared against the generation count of a cache storage. If the generation count of the data repository is higher than the generation count of the cache (indicating a later time value in the data repository), then the repository data has been changed and an update may be required in the cache. In some embodiments, the determination regarding an update may be made without requiring any interpretation of the data within the data repository, such as in circumstances in which the type and format of opaque is not known. In some embodiments, each content item (such as, for example, each movie, song, photograph, etc. of media data) and/or each metadata item also includes a date stamp or other time value that is stored, which may be utilized to identify in finer detail which metadata elements require caching.

In some embodiments, a system may provide all relevant metadata contained in the data repository to the cache if the generation count indicates a change. This process may be workable if the data in the data repository doesn't change very often and/or if the amount of metadata to be transferred is relatively small. However, transferring all of the data may be difficult because of the amount of data or the frequency of data modification.

In some embodiments, the process of updating metadata involves determining whether the generation count for the storage is older than the generation count for the cache. The storage may then request all metadata that has been updated between the two generation counts. The cache device may then again request the generation count of the storage. If the generation count of the storage is no longer older than the cache, then the cache has been fully updated. If the generation count has an older generation count, this indicates that another change has been made, and another update cycle may occur. This can continue until the dates match, or until the cache decided that the storage is being changed too often to update the cache continually.

In order to reduce the amount of data that is required to be transferred from a data repository to a data cache in updates, in some embodiments a log may be utilized to record any data changes. The log may be used to limit the transfer of data to the cache to only the modified data elements as reflected in the log. In a simple form, the log may represent a listing of each data element for which there has been a change in metadata. In some embodiments, the log does not represent the type or format of the data.

In some embodiments, a periodic update cycle will occur for data. The commencement of the update cycle might occur in multiple ways. In one embodiment, the cache may simply ask the storage for its current GC periodically, polling the storage at appropriate intervals. In another embodiment, a data repository may broadcast information regarding any data changes to devices on the network, and a device with a data cache may respond to the broadcast in order to, for example, synchronize the device's data cache with the data repository.

In some embodiments, in order to make a data repository inexpensive and available on a wide scale, a single-chip solution may be desirable. However, a single-chip solution typically will not include the memory, logic, and processing resources required to support standard database operations. Metadata is typically represented in the form of variable-length text strings, which are not easily supported in single-chip environments, even if full database support is not offered. In some embodiments, the database operations are simplified for a network data repository, with database operations generally being provided by the clients to the repository, which may assist in enabling a single-chip solution for network devices.

In some embodiments, a system provides a mechanism to store arbitrary and extensible metadata in a manner that enables capable clients to maintain a local cache (such as in a custom database) of the metadata, while also enabling simple clients to browse, filter, and search the metadata using a set of simple rules. Further, the types and values of the metadata are treated in an opaque fashion that is amenable to low-resource implementations. In some embodiments, operation is provided in an interconnected network without use of a central server.

FIG. 1 is an illustration of embodiments of a network including a network data repository. In this illustration, a network 105 includes multiple network devices, which may include network device A 110, network device B 115, network device C 120, and a network data repository 125. The network may include, but is not limited to, a personal entertainment network that includes multiple media devices. In some embodiments, the network data repository 125 includes a database of data content and metadata regarding such data content 130. The content data may be, for example, media data, with the metadata describing such media data. In some embodiments, the content data and metadata 130 may be available for access by any of the other network devices 110-120.

In some embodiments, the metadata is stored in an opaque manner such that it can store metadata for various different protocols. In some embodiments, the network data repository may not understand the metadata, with the data being stored in fields according to name of the field. In some embodiments, the metadata may be cached in one or more other network devices.

In one example, the data and metadata 130 may include movie data and metadata regarding such movie data. If network device A 110 is, for example, a set-top box for a television monitor, network device A 110 may maintain a cache of the movie metadata so that such data can be accessed and searched without accessing the network data repository 125. In some embodiments, the other network devices and the network data repository operate to maintain the cached data to match the stored metadata.

Figure 2:
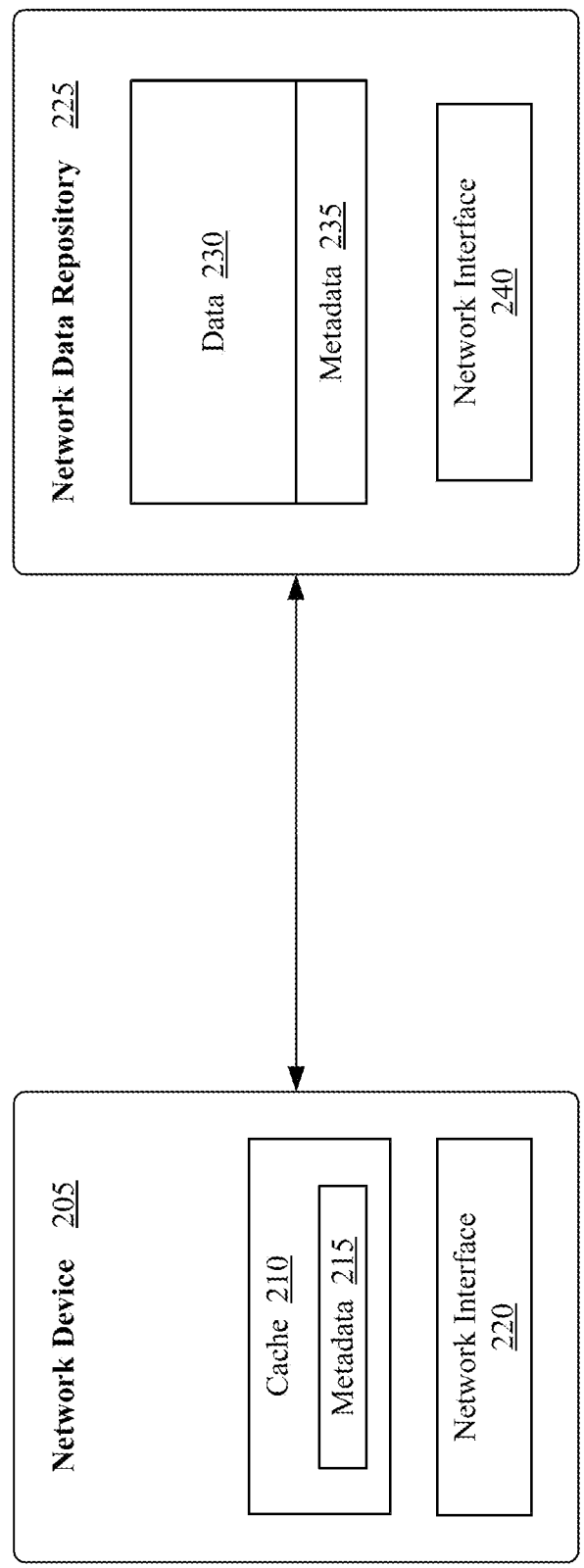
FIG. 2 illustrates embodiments for caching of metadata.

FIG. 2 illustrates embodiments for caching of metadata. As illustrated, a network device 205 communicates with a network data repository 225. The network data repository 225 includes a set of data 230 and metadata regarding such data 235. In an example, the data 230 may include media data of multiple different types, with appropriate metadata to describe such media data. The network data repository 225 further includes a network interface for communication on the network. The network device 205 includes a cache 210 for storage of metadata 215, and further includes a network interface 220 for communication on the network.

In some embodiments, the metadata 215 of the network device 205 is used to provide faster access to such information. The network device 205 and data repository 225 operate to maintain the current state of the metadata 215, which may require updating if there are changes in the storage of the metadata 235 in the data repository. However, network device 205 and data repository 225 may be lightweight network devices, with minimal processing capabilities. In some embodiments, the data repository is not aware of the format or contents of the metadata.

In some embodiments, a client of a repository may wish to support more advanced database queries than are supported by the mechanisms of the data repository, or may wish to present a unified database that spans multiple repositories. In this case, the client may wish to cache metadata within its own database. Without support for caching, a client would need to query the repository for metadata before satisfying any query, a process that becomes impractical as the number of items in the repository grows. In such operations, maintenance of the synchronization of the metadata in the cache with the metadata in the data repository is required. However, synchronization is made more complicated in the network data repository. Among other issues, updates to the metadata may be made by other devices without the knowledge of the client device.

In some embodiments, to facilitate remote caching by client devices, the use of a generation count or other time value on the data repository is maintained by the repository, with the generation count being used to establish the relative age of metadata. For example, the generation count may be a monotonically increasing integer that is incremented each time the repository changes, such as each time an item of content or metadata item is added, the value of a metadata item is changed, an item of content is changed, a metadata item is deleted, etc. In this example, the generation count should never decrease, and thus its representation should be sufficient to accommodate changes over the lifetime of the data repository.

In some embodiments, a simple caching technique would involve a client querying the repository for the current generation count, and recording such generation count in the client. The client then queries the repository for its entire set of metadata, and adds the metadata to the client's cache. Periodically the client may query the repository for the current generation count. If the current generation count differs from the client's recorded value of the generation count (i.e., the time value of the repository is later than the time value of the client), the client queries the repository for the entire set of metadata, and updates the client's cache accordingly. However, this approach may be costly in operation, particularly when changes to the repository are frequent or when there is a significant amount of metadata.

In some embodiments, a data repository may further include a modification time (MT) attribute for each piece of content. Whenever a piece of content or its metadata changes, the current generation count is recorded as the associated modification time. With this approach, a client can query the repository for the current generation count (as above), and if it differs, continue with a query for a list of updated content by including the latest generation count it knows. When the repository receives such a query, the repository iterates across the list of content and compares each modification time with the generation count from the client, returning the handle for each piece of content with a lower generation count. The client can then request the metadata only for those pieces of content that are new or modified.

The use of a modification time approach would require the client to collect all the metadata for each modified piece of content. In some embodiments, the modification time may be further enhanced by including a modification time for each item of metadata in addition to the content modification time. In this way, a query could return only the content and attributes that have been changed, rather than all metadata associated with the content.

Figure 3:
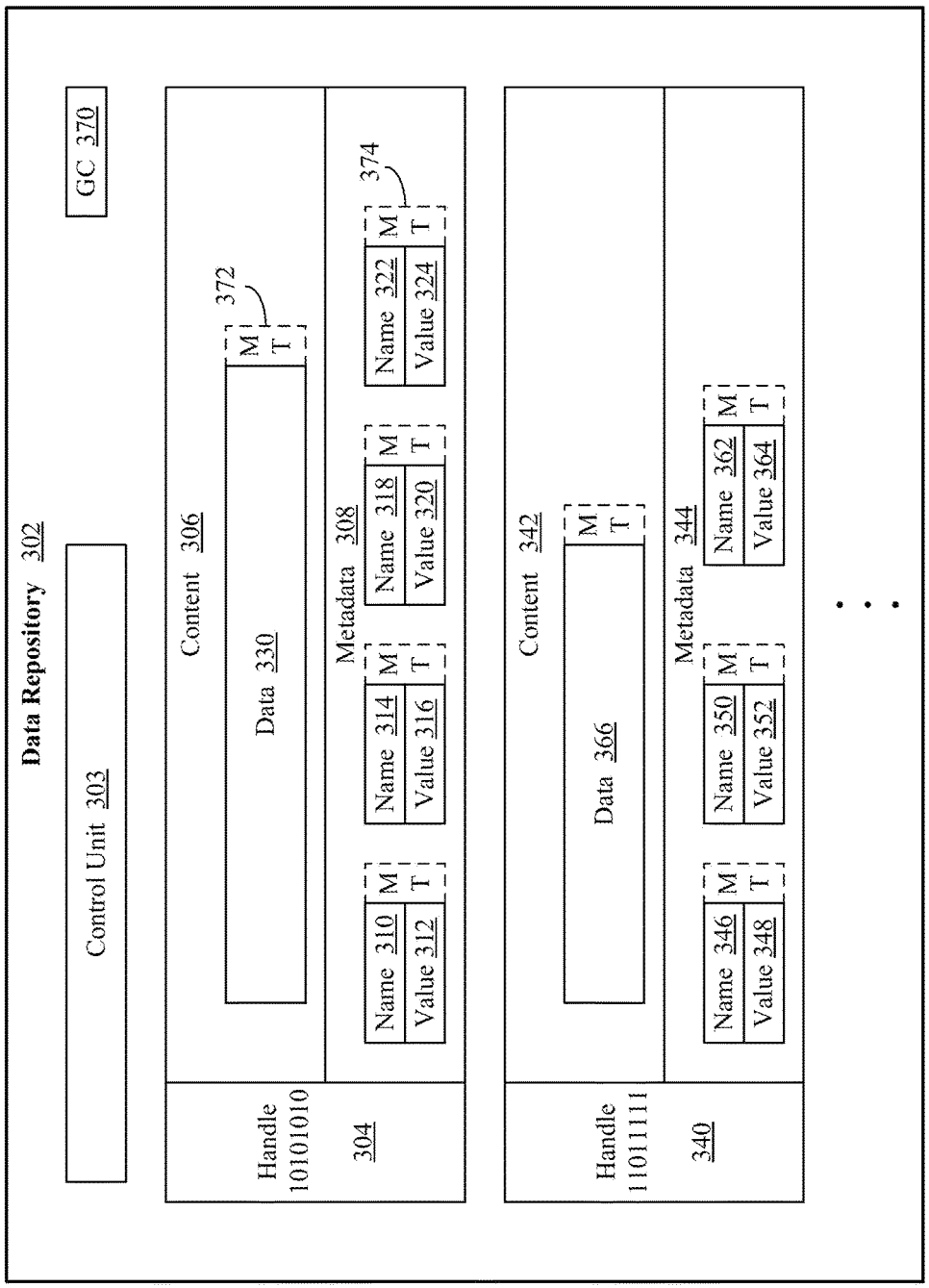
FIG. 3 illustrates embodiments of a network data repository.

FIG. 3 illustrates embodiments of a network data repository. In this illustration, a data repository 302 may be an element of a network, and may be utilized to store data of various types and formats. The data repository 303 may include a control unit 303 to control operation of the data repository, where the control unit may be a processor, control logic, or other hardware or software control. Each data content element is designated by a handle, which is defined as a fixed digit integer. For example, the content in data repository 302 may include content related to handle 304 (integer 10101010, to provide an example) and handler 340 (integer 11011111). Handle 304 is associated with content 306, content 306 including data elements 330. The handle is further associated with metadata 308, with each item of metadata having a name and a value, such as names 310, 314, 318, and 322 with values 312, 316, 320, and 324, respectively. Similarly, handle 340 is associated with content 342, including data elements 366. The handle is further associated with metadata 342, with each item having a name and a value, such as names 346, 350, and 362 with values 348, 352, and 364, respectively.

In addition, the data repository 302 includes a date stamp or other time value stored in a register or other memory, which here is shown as a generation count 370 that increases every time there is any change in the data repository data or metadata. In some embodiments, the generation count 370 will be compared against the generation count of a client device to determine whether a cache is up to date. In some embodiments, each item of content, such as data 330, includes a modification time MT 372, which is the time of the last modification of the data and may represent the generation count that was current at the time of the change. In some embodiments, the modification time may be used to determine which items of content have changed in relation to the cache of the client. In some embodiments, each item of metadata may also include a modification time, such as MT 374 for metadata name 322. MT 374 would reflect the current generation count when the metadata was last changed. In some embodiments, the modification time for each item of metadata may be used to limit updates to the client cache to the items of metadata that have changed.

In some embodiments, the use of time values such as generation counts and modification times in a system may enable a client to quickly synchronize its cache in the face of multiple data additions and modifications. However, handling deletions of data gracefully may create more difficulty. To discover which piece of content has been deleted, a client may be required to query the entire repository. Similarly, to discover a deleted item of metadata, a client may be required to query all metadata for a piece of content.

In some embodiments, a data repository maintains a log of the latest content deletions, recording the content handle and generation count. When the client makes a query for the repository changes, the data repository also compares the generation count from the client with the times stored in the deletion log. If the client's generation count is beyond the last item in the log, this indicates that nothing has been deleted since the last update of the client cache, and thus nothing is returned. If the generation count of the client proceeds any deletion time in the log, then the client may then query the entire repository to discover what has been deleted. The time consumed in such querying may be minimized by frequent polling of the repository. If the client's generation count falls within the deletion times of items in the log (some deletions older, and some deletions newer), then the repository returns the content handles with deletion times that exceed the client's generation count.

In some embodiments, a log is extended to further include updates to content. In such embodiments, the repository is not required to iterate across all of the content of the repository, comparing generation counts. In some embodiment, the log may further include records of individual metadata updates. If this information is included, the information may be used to identify the individual items of metadata that required updating in the cache without iterating across all such metadata. To determine the elements to be stored in the log, a designer may balance elements such as the time saved in using the log, the number of queries received by the data repository, and the size of the log required.

Figure 4:
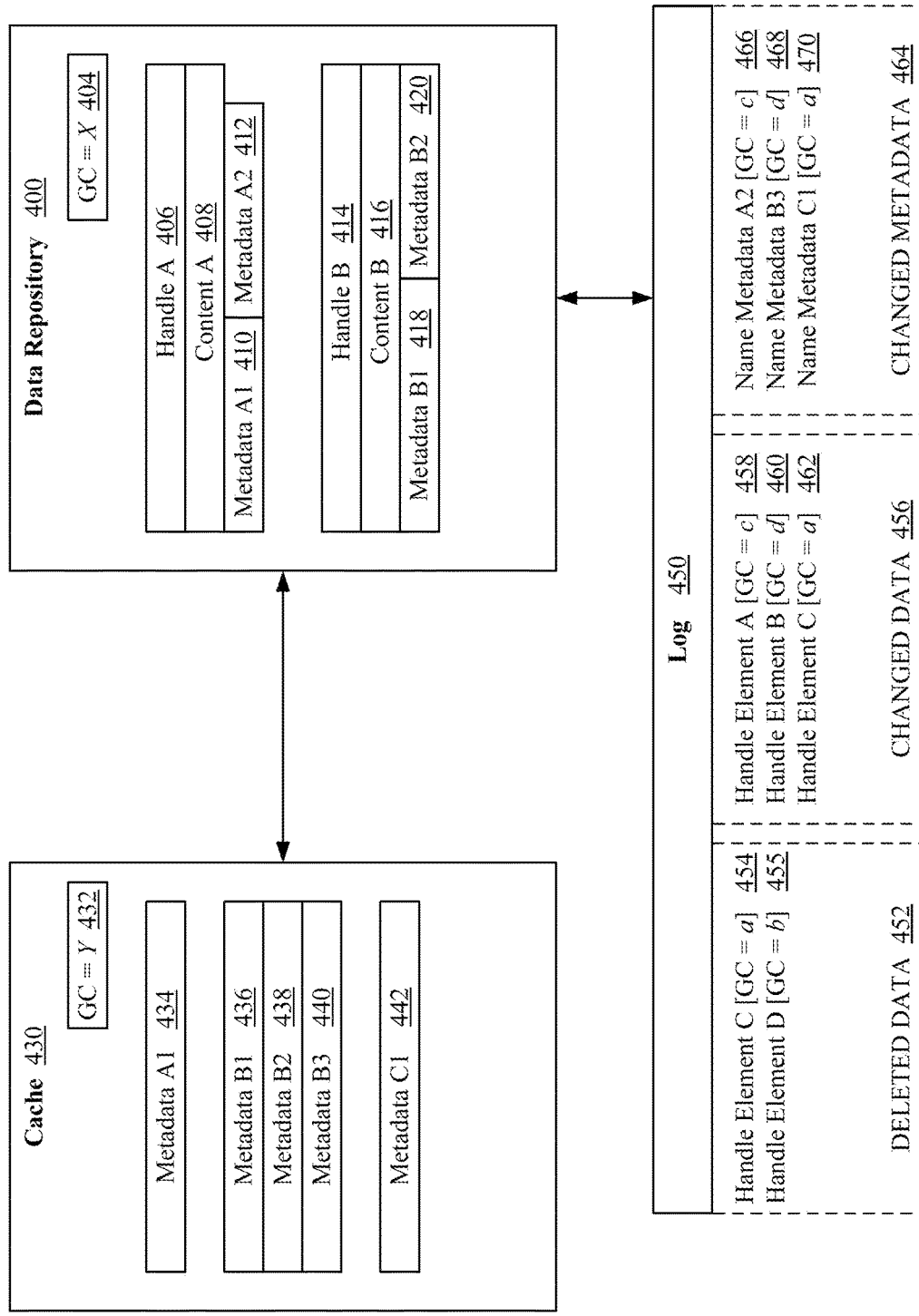
FIG. 4 is an illustration of embodiments of a cache and data repository for storage of metadata.

FIG. 4 is an illustration of embodiments of a cache and data repository for storage of metadata. A data repository 400 includes a generation count 404 stored in a register or other memory, the generation count to increase each time a change is made in the data or metadata within the data repository. At a point in time, the GC equals a value X. In this example, at a point in time the data repository includes a content entry with handle A 406 and containing content A 408, with the content being associated with metadata A1 410 and metadata A2 412; and a content entry with handle B 414 and containing content B 416, with the content being associated with metadata B1 418 and metadata B2 420

In this illustration, a cache 430 of a client device is intended to remain in sync with the metadata of the data repository 400. The cache currently has generation count Y. However, changes have been made, and thus the cache is not up to date. The cache generation count Y would thus be less than repository generation count X. As illustrated, the cache 430 includes metadata A1 434, metadata B1 438, metadata B2 438, metadata B3 440, and metadata C1 442. Thus, the cache may be missing metadata A2 (later entered), may include deleted metadata B3, and may include metadata C1 for a deleted content item. (In this illustration, metadata with the same designation has not been changed.)

In some embodiments, the client device may periodically poll the repository 400. In this instance, the repository will return generation count X 404, which the client device will determine is greater than the generation count Y of the cache 430. In some embodiments, the cache may request that all of the metadata of the data repository 400 be returned. However, this will result in more metadata than is required. In some embodiments, the content elements 408 and 416 may each include a modification time that may be used to determine which content element has been changed. In some embodiments, the metadata elements 410, 412, 418, and 420 may each include a modification time that may be used to identify which metadata elements have been subject to change.

In some embodiments, the data repository may have or may be associated with a data log 450, which is intended to assist the data repository in responding to queries. In some embodiments, the data log may allow the repository to respond with less metadata or to more quickly respond with the correct data. In some embodiments, the log 450 may include handles of deleted content 452, together with a modification time that indicates when the data was deleted. In this case, the log should reveal that content element C 454 was deleted at a time a and a content element D 455 was deleted at a time b. Comparing the modification times with the generation count 432, it may be determined that, for example, content element D 455 was deleted prior to the last update of cache 430, and thus no update is required, but content element C 454 was deleted after the last update of cache 430, and thus an update is required to remove the metadata related to the deleted content (metadata C1 442, in this case).

In some embodiments, the log 450 may also include handles of changed data 456 together with the modification time for the change. In this instance, a query to the repository may reveal that content A 458 was modified at time c, content B 460 was modified at time b, and content C was modified at time a (when it was deleted). This information may be compared to the generation count 432 of cache 430, and may indicate that the change in content A means that all metadata related to content A should be provided to the cache (metadata A1 410 and metadata A2 412, thus adding the missing metadata A2 412 to the cache). Further, the change in content B means that all metadata related to content B should be provided (metadata B1 418 and metadata B2 420, thus allowing for the removal of deleted metadata B3 440 from the cache).

In some embodiments, the log 450 may also include names of changed metadata elements 464. In this illustration, a query to the log may indicate that metadata A2 466 was changed at time c (when it was added to the repository), metadata B3 468 was changed at time d (when it was deleted from the repository), and metadata C1 470 was changed at time a (when the content was deleted). A comparison of the generation count 432 of the cache 430 with the generation count of each metadata entry will indicate that an update for the cache will include the addition of metadata A2 and the deletion of metadata B3 from the cache 430

FIG. 4 is a simplified illustration of the operation of a log in certain embodiments. In some embodiments, the log entries may include additional information that is not shown in FIG. 4, or may exclude certain information that is illustrated in FIG. 4.

In some embodiments, attribute names for metadata are assigned in a hierarchical fashion. A top-level attribute class breaks attribute names into broad categories. For example, media data attributes may include movie content, music content, photo content, device attributes, vendor-specific attributes, etc. In some embodiments, the attribute class is represented as a fixed-format integer, with value ranges being assigned to particular uses. For example, well-known attribute classes may be assigned a first range of values. Vendor-specific attributes may be assigned a second range of values, with, for example, a global authority being responsible for assigning unique values to individual vendors. A third range of values may be left undefined so that an application can make use of those values without appealing to a global authority. In this example, collisions may result in the use of the third range, such as if there is an attempt to use the same values for different purposes, and application designers may be responsible for handling this issue.

In some embodiments, an attribute type defines a subcategory for the attribute class, allowing for values that are class-specific. In some embodiments, ranges are assigned to particular uses. Well-known values include attribute types such as name, artist, rating, duration, icon, etc. The well-known values can be further grouped by an assignment authority to facilitate filtering operations. In an example, all video-related attributes may be grouped together so that a range check can be used when parsing a request for a particular attribute. Another range may be reserved for extensions, with the same caveats as described above for attribute class.

In some embodiments, the numerical based format may be mapped to a string-based representation when presented to a user. However, the design of the actual repository does not require such mapping, and thus the process may be simplified for implementation in a lightweight device, such as a single chip.

In some embodiments, a data repository itself is not required to be aware of the ranges assigned to attributes, or of the interpretations of the attribute classes and types. In some embodiments, when an attribute (an item of metadata) of a particular class and type is stored in a data repository, the data repository logically creates a directory (if needed) with the attribute class as its name and stores within it a file whose name is the attribute type. In some embodiments, the data repository will utilize the attribute to store and retrieve any value without interpretation, as the file contents as well may be treated as opaque data.

In an operation, an external client, such as a remote network device, may wish to navigate the network data repository based on certain attributes. The data repository provides an enumeration of the content handles contained in the data storage. Because the client may be remotely located, support for responding to a request with a collection of handles (which are simple integers) may help in reducing network traffic. In some embodiments, attribute names may be fixed length strings. The use of fixed length string attribute names may be used to enable simple byte-wise comparison, in a similar fashion as a comparison of integer values, while also allowing the use of extensions by users with lower risk of data collisions that would occur if the same name is used for different attributes. In other embodiments, a variable length string may instead be used as an attribute name with, for example, the length of the string being included in the attribute.

In some embodiments, an enhanced scheme allows a client to search for content based on the value of a particular piece of metadata. The client submits the attribute class and type along with opaque data to match against the values stored in the repository. In this operation, the repository is not required to interpret the value of any metadata. Instead, the repository may simply compare the contents of each corresponding meta-file and return the handles of the contents that match.

In some embodiments, a more advanced data repository may include support for a set of Boolean operations on a set of such exact-match queries. For example, a client could pose a query by sending a series of tuples consisting of attribute class, type, and value. These elements may form the terms of a Boolean query. The relations between the terms may be used to enable complex queries, such as to find all movies of a particular genre that were released in a particular year. In some embodiments, such exact-match filters may be easily supported by a low-resource device, within the storage that is available to store a query. In some embodiments, if a client informs the repository regarding how an attribute value should be interpreted, more complex queries may be possible. In some embodiments, if the set of allowed interpretations is kept to a minimum, low-resource embodiments may be enabled. For example, if 32-bit and 64-bit big endian integers are supported, numerical range checking is possible, such as to find all content released in the 1970s. Further, if substring matching is supported, then an exact match could be found anywhere in the stored value, such as to find all movies with a particular actor in the cast. If case and character set are further specified, a more intelligent match can also be made, but this comes at the cost of localization or increased resources. In some embodiments, low-cost filtering techniques can be applied to this scheme of storing metadata in the form of numerical attribute class and type along with an opaque value.

Figure 5:
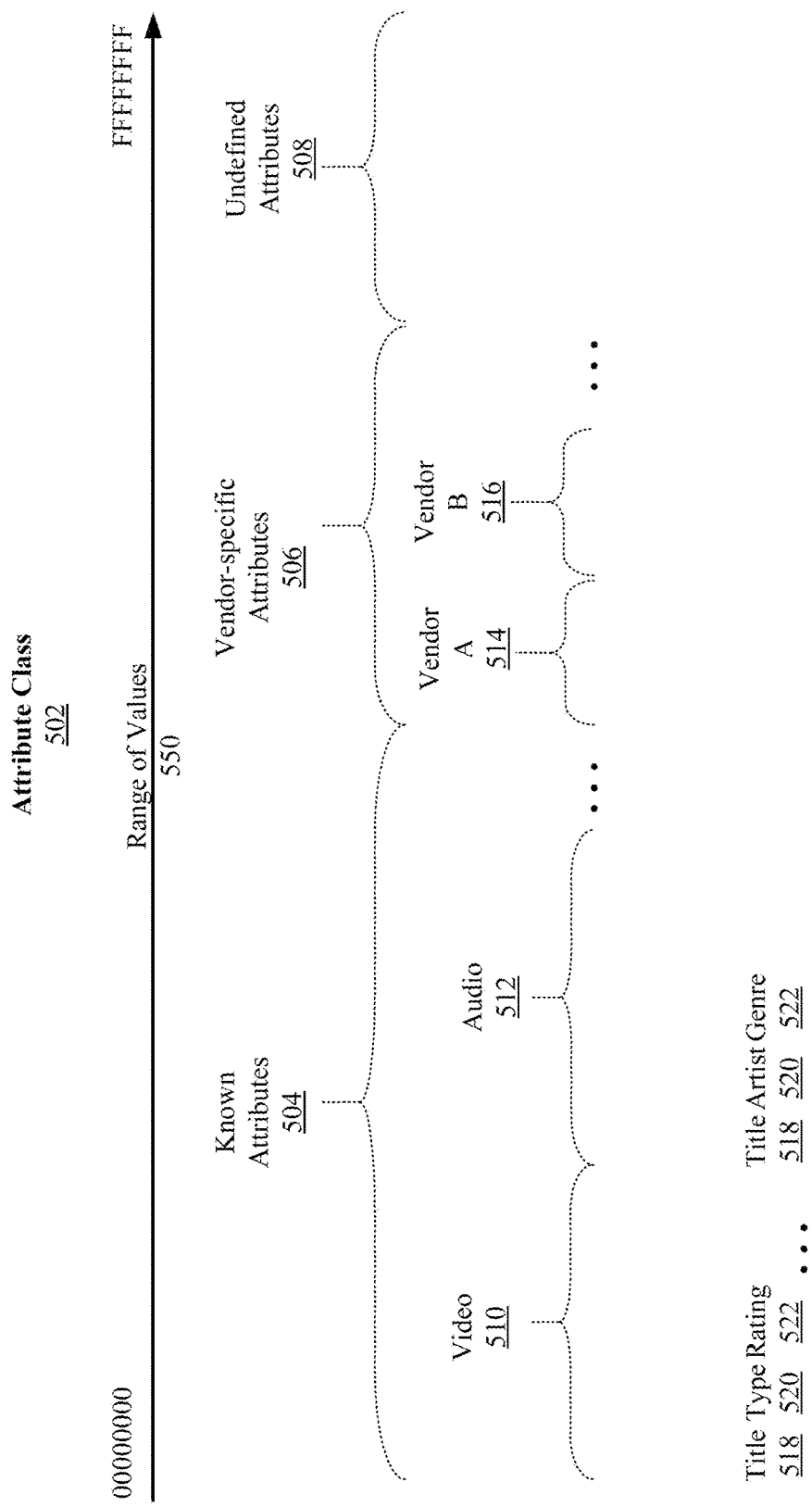
FIG. 5 illustrates embodiments of metadata attributes for use in a data repository.

FIG. 5 illustrates embodiments of metadata attributes for use in a data repository. In this illustration, an attribute class 502 may include many metadata attributes. In some embodiments, the attributes have names that are assigned numerical values, such as fixed digit integer values. In some embodiments, the values may form a range of values 550, shown for illustration as a range from hexadecimal values 00000000 to FFFFFFFF. Within this overall range of values, ranges may be established for certain purposes, with the ranges defining attribute types within the attribute class. In an example, a first range may be established for an attribute type of known attributes 504, a second range may be established for an attribute type of vendor-specific attributes 506, and a third range may be established for an attribute type of undefined attributes 508.

Within the known attributes 504, there may be sub-ranges providing attribute types for video attributes 510 and for audio attributes 512, among others. The video attributes could include metadata such as a video title 518, type of video 520, video rating 522, and others. The audio attributes could include audio title 518, artist 520, musical genre 522, and others. Within the vender-specific attributes 506, there may be a sub-range for a vendor A 514 and a sub-range for a vendor B 516.

In some embodiments, repository mechanisms may include the ability of the data repository to send out notifications when the data repository has been changed, thereby reducing or eliminating the need for polling by client devices. In some embodiments, clients may be allowed to register for notification of changes. Registration of clients will require record keeping and connection management on the part of the repository to support the process. In some other embodiments, the repository may broadcast notifications for all interested parties to hear. In some embodiments, the notification indicates that there has been a change in the data repository. In some embodiments, the notification may include further information regarding the change. Enhancements of the notification may include, for example, the new generation count, the content handle(s) changed, the metadata item(s) changed, and the metadata value(s) changed. In some embodiments, multiple notifications may be coalesced, which may be used to reduce chatter when modifications are frequent.

Figure 6:
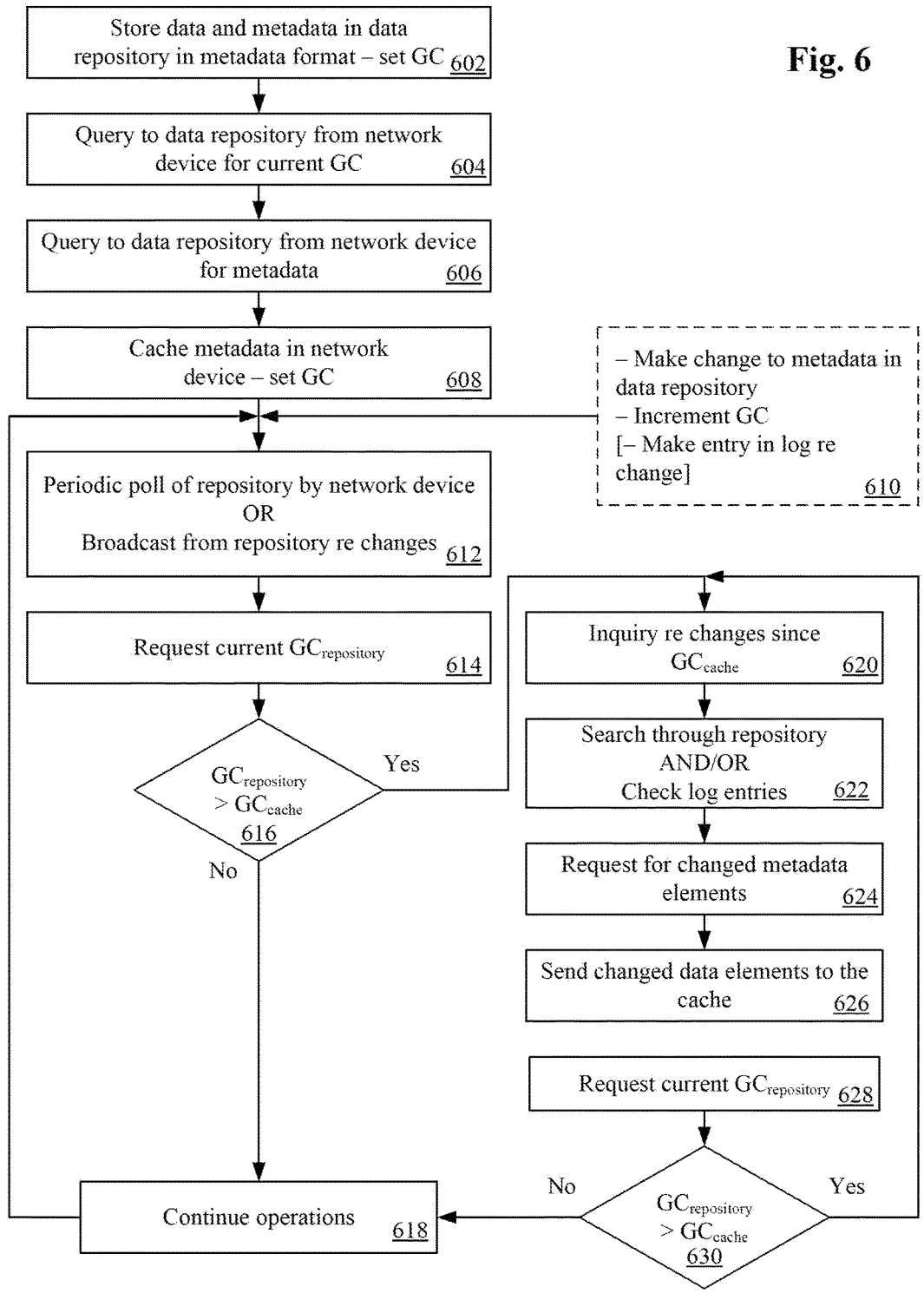
FIG. 6 is a flowchart to illustrate embodiments of a process for maintaining a cache of metadata from a network data repository.

FIG. 6 is a flowchart to illustrate embodiments of a process for maintaining a cache of metadata from a network data repository. In this process, certain data and metadata may be stored in a data repository 602. When such data is stored, a generation count (or other time value) is set, with the generation count representing the current state of the repository. A query to the data repository may later be received from a network device for the current generation count 604. This may be followed by a query requesting all metadata of certain types for the current generation count 604. This may include the initialization of the cache or a portion of the cache, such as when the network device is first connected or initialized. The resulting metadata is then cached in the network device, and a generation count for the cache is set to the generation count of the data repository 608. At some point in time, there may be a change in the data repository 610. This change results in incrementing the generation count of the data repository. Further, if there is a log associated with the data repository, the appropriate entries in the log may be made.

In some embodiments, a process may be initiated by, for example, periodic checks (polls) by the network device to the data repository, or by a broadcast message from the data repository to the network device alerting the network device of a change to repository data 612. The network device queries the data repository for the current generation count of the repository 614. If the generation count of the repository is not greater than the generation count of the cache, then there have been no changes since the last update of the cache and normal operations may continue 618. If the generation count of the repository is greater than the generation count of the cache (indicating a later time value for the repository than for the cache), then there have been one or more changes since the last update of the cache, and an inquiry is made by the network device regarding changes since the generation date of the cache 620. Obtaining the changed items may include searching through the repository and/or checking log entries, if a log is associated with the data repository 622. There may then be a request for any changed metadata elements 624. The changed metadata may include some or all of the elements already present in the data cache, depending on the ability of the data repository to discern which elements have changed. The data repository then provides the changed metadata elements to the cache, and the generation count of the cache is reset to the generation count that was received from the data repository 626. There may then be another query for the current generation count of the data repository 628. If the generation count of the repository is greater than the generation count of the cache 630, then additional changes have been made to the data repository, and the update cycle may return to a query regarding any changes that have occurred, since the generation count of the cache 620. If the generation count of the repository is not greater than the generation count of the cache 630, then additional changes have not been made to the data repository, and operations may be continued 618.

Figure 7:
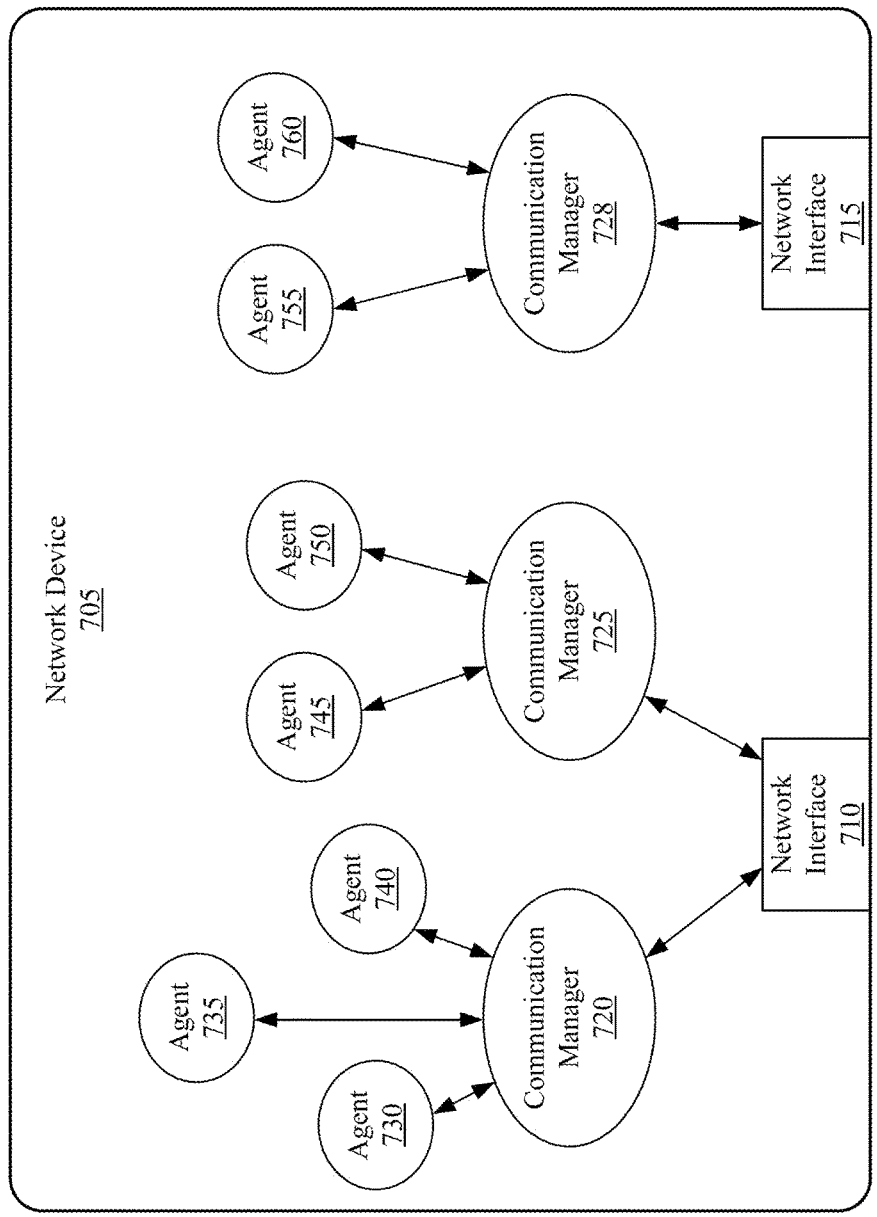
FIG. 7 is an illustration of embodiments of a network device.

FIG. 7 is an illustration of embodiments of a network device. In some embodiments, a network device 705 is an entity with at one physical network interface, such as an Ethernet MAC address. As illustrated in FIG. 7, the network device includes two network interfaces 710 and 715. In some embodiments, network device thus is a physical entity. In some embodiments, the network device includes one or more agents, with each agent being a logical entity that resides on a network device. There may be multiple agents on a network device. For example, FIG. 7 illustrates a network device 705, with network interface 710 providing access to agents 730, 735, and 740 via communication manager 720 and agents 745 and 750 via communication manager 725, and providing access to agents 755 and 760 via communication manager 730. In some embodiments, each agent is assigned a globally unique identifier to distinguish it from other agents, independent of the network device IP address and across device reset operations. In this manner, a command that is intended for agent 755 may be addressed to the unique address for the agent, and the message will then be directed through network interface 715 to agent 755.

In some embodiments, agents serve as endpoints of communication within a network device, and provide a particular set of capabilities and associated behaviors. Agents may include media sources, media sinks, media controllers, and other elements. In one example, an agent may provide a video streaming service. In this example, the agent responds to messages to query and control media streams, and, when instructed, the agent may autonomously deliver a media stream to another agent. In some embodiments, an agent has no more than one active media session at any time, thus providing for relatively simple operation. An agent may be viewed as acting as an active object in that the agent may send and receive messages, modify internal state in response to such messages, and has the ability to perform continuous actions as a side effect.

In some embodiments, an agent may communicate on an entertainment network by way of a communication manager. In some embodiments, there may be one or more communication managers per device, such as communication managers 720, 725, and 730 in FIG. 7. In some embodiments, multiple agents may be managed by a single communication manager, such as, for example, agents 730, 735, and 740 being managed by communication manager 720. In some embodiments, a communication manager is responsible for routing messages to and from the agents that are bound to the communication manager. The process may include delivering messages to other agents that are local to the same network device, multiplexing messages from individual agents onto outgoing connections to agents on remote network devices, and handling broadcast requests. In some embodiments, an agent may be bound to only one communication manager, and a communication manager may be bound to only one network interface.

In some embodiments, a display manager is an agent that manages the resources on a display device. Specifically, the display manager is responsible for granting access to the display resources and screen geometry. In some embodiments, each display device has only one display manager for each related set of I/O devices, such as video output, graphics output, audio output, and user input. In some embodiments, the agent works with a session manager to coordinate the delivery and display of media content at the display device, granting access to the display device resources. In some embodiments, a display manager represents the starting point for a user session and delegate controls to a session manager.

In some embodiments, a session manager is an agent that coordinates a set of media content for an active user. In some embodiments, once selected, a session manager initiates a remote on-screen display session with the corresponding display manager and begins to execute an application program to manage other devices in the network. In some embodiments, a display manager forwards input events to the session manager and grants access rights to its display resources, which a session manager can delegate to other agents, thus allowing the other agents to deliver content to the display. In one example, a display manager may grant access rights to a session manager that executes within a set-top box. The session manager may initiate a remote UI (user interface) session with the display, and allows the user of the network device to select a video to be played from a remote video storage device. In some embodiments, the session manager may pass access rights to a video server, and direct the video server to deliver a media stream to the display. In some embodiments, session managers maintain the states necessary to manage a user's experience in utilizing media content.

Figure 8:
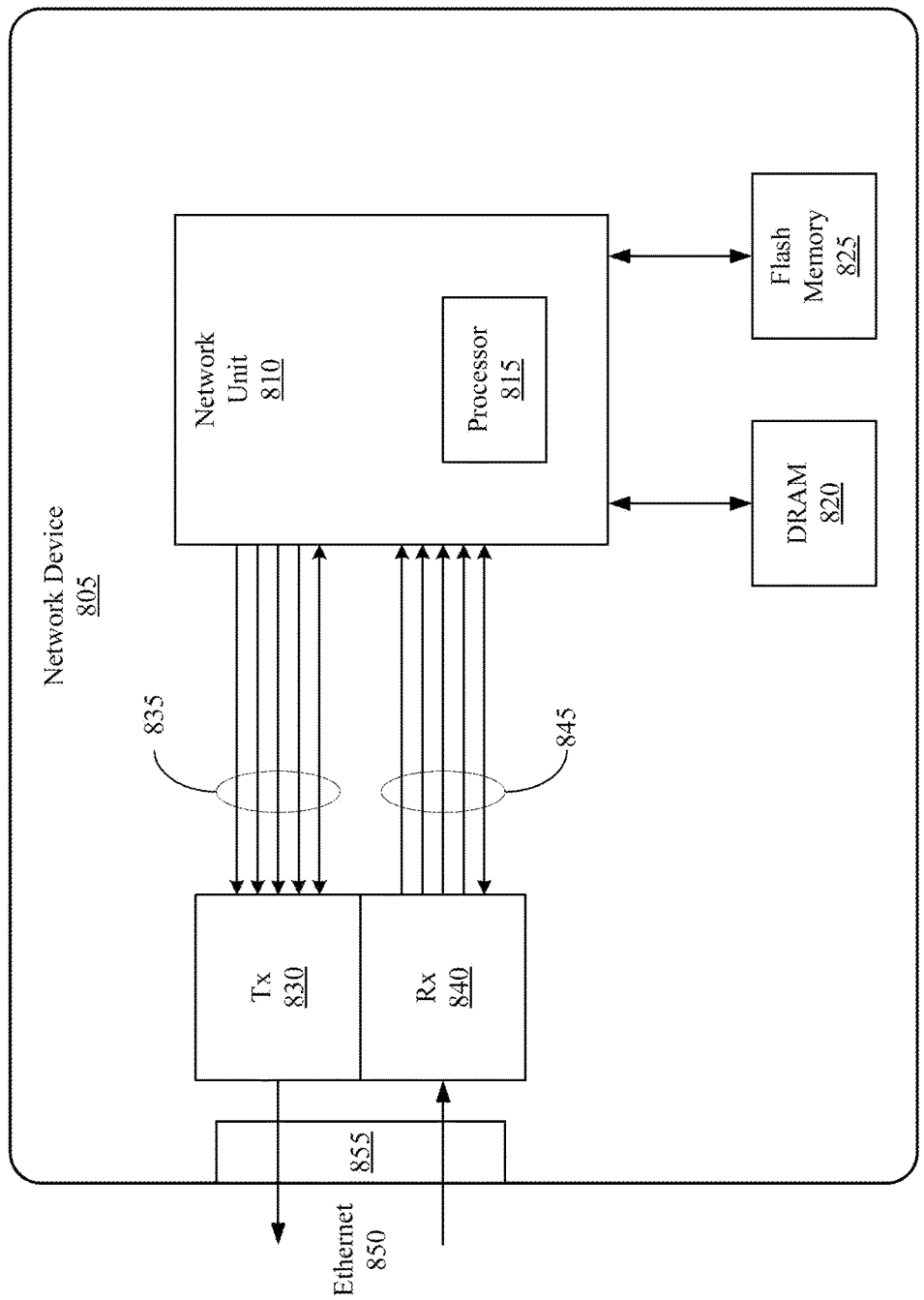
FIG. 8 is an illustration of embodiments of components of a network device.

FIG. 8 is an illustration of embodiments of components of a network device. In this illustration, a network device 805 may be any device in an entertainment network, including, but not limited to, devices illustrated in FIG. 1. For example, the network device may be a television, a set top box, a storage unit, a game console (which may, for example, utilize two-dimensional or three-dimensional graphics data), or other media device. In some embodiments, the network device 805 includes a network unit 810 to provide network functions. The network functions include, but are not limited to, the generation, transfer, storage, and reception of media data streams. The network unit 810 may be implemented as a single system on a chip (SoC) or as multiple components.

In some embodiments, the network unit 810 includes a processor for the processing of data. The processing of data may include the generation of media data streams, the manipulation of media data streams in transfer or storage, and the decrypting and decoding of media data streams for usage. The network device may also include memory to support network operations, such as DRAM (dynamic random access memory) 820 or other similar memory and flash memory 825 or other nonvolatile memory.

The network device 805 may also include a transmitter 830 and/or a receiver 840 for transmission of data on the network or the reception of data from the network, respectively, via one or more network interfaces 855. The transmitter 830 or receiver 840 may be connected to a wired transmission cable, including, for example, an Ethernet cable 850, or to a wireless unit. The transmitter 830 or receiver 840 may be coupled with one or more lines, such as lines 835 for data transmission and lines 845 for data reception, to the network unit 810 for data transfer and control signals. Additional connections may also be present. The network device 805 also may include numerous components for media operation of the device, which are not illustrated here.

Figure 9:
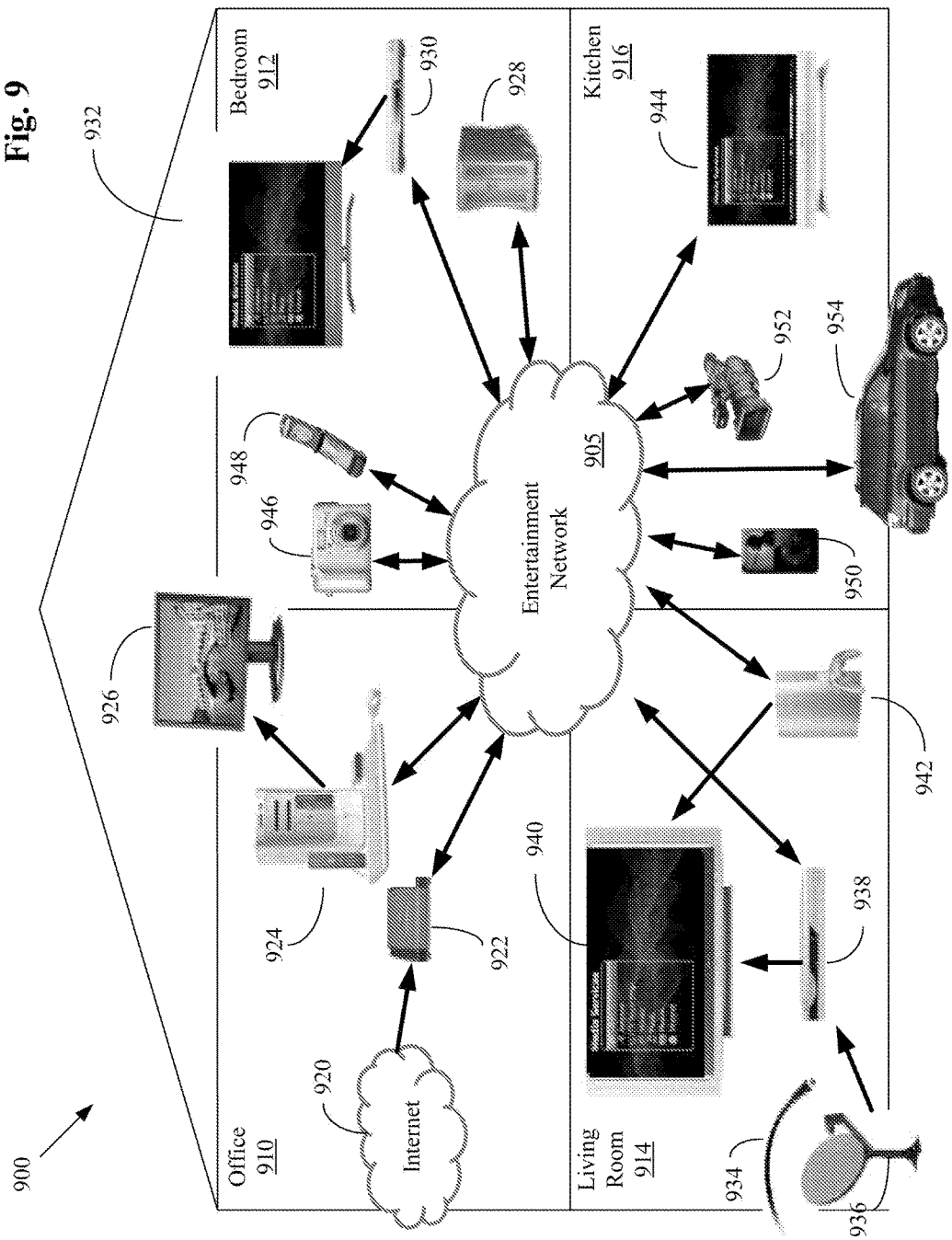
FIG. 9 is an illustration of embodiments of an entertainment network.

FIG. 9 is an illustration of embodiments of an entertainment network. In this illustration, the entertainment network system 900 provides for the connection of any compatible media device to the network. The connection is shown as a connection to entertainment network 905. In some embodiments, the devices operate as network without a central network server. Through the entertainment network, media data streams may be transferred between any of the connected devices. In addition, devices may be controlled remotely through the network. The devices may be connected to the network via any known connector and connection protocol, including coaxial cables, Ethernet cables, and Firewire, and wireless connections via Wi-Fi, Bluetooth, and other wireless technologies.

In some embodiments, the devices may include any media sources or recipients. In FIG. 9, an office 910 may provide an Internet connection 920 via a modem 922 to the network 905. The data received from the Internet may include any streaming media sources, including, but not limited to, purchased audio files (such as downloaded music files), video files (such as movies, television, and other), and computer games. The office 910 may also be connected to a personal computer 924 that utilizes a monitor 926, which may, among other functions, display certain media streams or operate certain computer games.

The entertainment network may also be connected with devices in a bedroom 912, which may, for example, contain a set top box 930 to provide data to a television 932. In addition, the bedroom (or any other space) may contain a media storage unit 928. The media storage unit 928 may receive data from any source connected to the network 905, and may provide to any data recipient connected to the network 905. The media storage unit 928 may contain any type of media stream data for the network.

The system may further include a living room 914 receiving, for example, input from a cable or fiber system 934 or from a satellite disk network 936. The media input from such sources may be provided to a set top box 938 connected to the network 905 and to a second television 940. Also connected to the network 905 for display on the living room television 940 may be a video game unit 942. There may be any number of other rooms with networked devices, such as a kitchen containing a third television 944 connected to the network 905. Other network devices may also be present, including, but not limited to, a stereo audio system that may include speakers placed throughout the house.

In addition, any number of mobile personal electronic devices may connect to the network. The devices may connect via a cable or via a wireless signal, including, but not limited to, Bluetooth, Wi-Fi, infrared, or other similar wireless communication protocol. Each such protocol may require an interface to the network (which are not shown in FIG. 9), such as a Wi-Fi base station. Such mobile personal electronic devices could include a digital camera 946, a cellular telephone 948, a personal music device 950, or a video camera 952. In addition, a mobile system contained in an automobile 954 may connect to the network 905 when the automobile is in close proximity to the network (such as when present in a garage of the house). The mobile personal electronic devices may, for example, automatically connect to the network when within range of the network. While connected, the devices may be available to obtain data through the network or to provide data to the network, including possible automatic updates or downloads to the devices. In one example, a user may be able to access the data contained in any of the mobile electronic devices through the network, such as accessing the photographs stored on the digital camera 946 on the living room television 940 via the set top box 938. In some embodiments, the network devices illustrated in FIG. 9 are low resource devices that have been designed with limited network processing and buffering capabilities.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The machine-readable medium may include, but is not limited to, floppy diskettes, optical disks, CD-ROMs (compact disk read-only memory), and magnetooptical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A system comprising:
    a first network device having a first IP address, the first network device comprising:
        a memory configured to store instructions; and
        a hardware processor configured to execute the instructions to cause the first network device to:
            provide a first agent configured to engage in a media communication with a second agent provided by a second network device having a second IP address,
            wherein the first and second agents are respectively associated with globally unique first and second identifiers to distinguish them from other agents, wherein the first and second identifiers are independent of the first and second IP addresses to permit the first and second agents to be accessed across device reset operations performed on the first and second network devices,
            wherein the media communication is addressed from the first agent to the second agent using the globally unique second identifier of the second agent,
            wherein the first agent is a display manager agent and the second agent is a session manager agent;
            wherein the display manager agent is configured to control access by the session manager agent to display resources, and
            wherein the second agent is configured to receive access rights to the display resources from the display manager agent and to direct a media server to deliver the media communication to the display resources.

2. The system of claim 1, wherein the media communication comprises a request by the first agent to receive a media stream from the second agent.

3. The system of claim 1, wherein the media communication comprises a media stream provided from the first agent to the second agent.

4. The system of claim 1, wherein the hardware processor is configured to execute the instructions to cause the network device to provide a communication manager configured to pass the media communication between the first agent and the second network device.

5. The system of claim 4, wherein the media communication is a first media communication, wherein the hardware processor is configured to execute the instructions to cause the network device to provide a third agent, wherein the communication manager is configured to pass a second media communication between the first and third agents within the first network device.

6. The system of claim 1, wherein the first network device is a display device further comprising the display resources.

7. The system of claim 1, wherein the first and second IP addresses are associated with first and second physical network interfaces of the first and second network devices.

8. The system of claim 1, wherein the first and second agents are active objects configured to modify their respective internal states in response to one or more media communications.

9. The system of claim 1, wherein the system is an entertainment network system further comprising the second network device, wherein the media communication comprises a video stream.

10. A method comprising:
    providing a first agent by a first network device having a first IP address;
    engaging the first agent in a media communication with a second agent provided by a second network device having a second IP address;
    wherein the first and second agents are respectively associated with globally unique first and second identifiers to distinguish them from other agents, wherein the first and second identifiers are independent of the first and second IP addresses to permit the first and second agents to be accessed across device reset operations performed on the first and second network devices;

wherein the media communication is addressed from the first agent to the second agent using the globally unique second identifier of the second agent;

wherein the first agent is a display manager agent and the second agent is a session manager agent;

controlling, by the display manager agent, access by the session manager agent to display resources;

receiving, by the session manager agent, access rights to the display resources from the display manager agent; and directing, by the session manager agent, a media server to deliver the media communication to the display resources.

11. The method of claim 10, wherein the media communication comprises a request by the first agent to receive a media stream from the second agent.

12. The method of claim 10, wherein the media communication comprises a media stream provided from the first agent to the second agent.

13. The method of claim 10, further comprising:
providing a communication manager by the first network device; and
passing, by the communication manager, the media communication between the first agent and the second network device.

14. The method of claim 13, wherein the media communication is a first media communication, the method further comprising:
providing a third agent by the first network device; and
passing, by the communication manager, a second media communication between the first and third agents within the first network device.

15. The method of claim 10, wherein the first and second IP addresses are associated with first and second physical network interfaces of the first and second network devices.

16. The method of claim 10, wherein the first and second agents are active objects configured to modify their respective internal states in response to one or more media communications.

17. The method of claim 10, wherein the method is performed by an entertainment network system, the method further comprising providing the second agent by the second network device, wherein the media communication comprises a video stream.

18. The method of claim 10, wherein the first network device is a display device further comprising the display resources.

* * * * *